(12) United States Patent
Pitchandi et al.

(10) Patent No.: US 9,218,127 B2
(45) Date of Patent: Dec. 22, 2015

(54) SYSTEMS AND METHODS FOR FAST KEYBOARD ENTRY USING A REMOTE CONTROL IN VIDEO CONFERENCING AND OTHER APPLICATIONS

(71) Applicant: Vidyo, Inc., Hackensack, NJ (US)

(72) Inventors: Balasubramanian Pitchandi, Hackensack (IN); Scott Van Der Sluys, Englewood, NJ (US); Sverre Wendelbo, New York (FR)

(73) Assignee: Vidyo, Inc., Hackensack, NJ (US)

( * ) Notice: Subject to any disclaimer, the term of this patent is extended or adjusted under 35 U.S.C. 154(b) by 0 days.

(21) Appl. No.: 14/523,389

(22) Filed: Oct. 24, 2014

(65) Prior Publication Data

US 2015/0193143 A1 Jul. 9, 2015

Related U.S. Application Data

(60) Provisional application No. 61/895,286, filed on Oct. 24, 2013.

(51) Int. Cl.
| | |
|---|---|
| *H03K 17/94* | (2006.01) |
| *G06F 3/0489* | (2013.01) |
| *H04N 21/422* | (2011.01) |
| *H04N 21/4788* | (2011.01) |
| *H04N 7/15* | (2006.01) |

(52) U.S. Cl.
CPC ...... *G06F 3/04892* (2013.01); *H04N 21/42213* (2013.01); *H04N 21/4788* (2013.01); *H04N 7/15* (2013.01)

(58) Field of Classification Search
CPC .............. G06F 3/04892; H04N 21/42213
USPC .............. 341/22, 23; 345/157, 160
See application file for complete search history.

(56) References Cited

U.S. PATENT DOCUMENTS

| | | | | |
|---|---|---|---|---|
| 8,896,469 | B2 * | 11/2014 | Lazaridis | G06F 3/0236 341/22 |
| 2009/0172604 | A1 * | 7/2009 | Moosavi | G06F 3/0202 715/856 |
| 2012/0105327 | A1 * | 5/2012 | Lazaridis | G06F 3/0236 345/160 |

* cited by examiner

*Primary Examiner* — Creighton Smith
(74) *Attorney, Agent, or Firm* — Baker Botts, LLP (57) ABSTRACT

Systems and methods for performing data entry in videoconferencing and other systems that use remote controls and other non keyboard-based user interface devices. In some embodiments, the keys of a numeric keypad are associated with letters and symbols, such that when a number key is pressed the system displays a selection of choices in a spatial configuration, including the number pressed as well as additional character choices. Users can use navigation buttons to move the selection to any one of the displayed characters and select it, thus minimizing the number of remote control operations for data entry.

9 Claims, 9 Drawing Sheets

Character Input

Numeric Input

SYSTEMS AND METHODS FOR FAST KEYBOARD ENTRY USING A REMOTE CONTROL IN VIDEO CONFERENCING AND OTHER APPLICATIONS

CROSS-REFERENCE TO RELATED APPLICATION

This application claims priority to U.S. Ser. No. 61/895,286, filed Oct. 24, 2013, titled "Systems and methods for fast Keyboard Entry Using a Remote Control in Video Conferencing and Other Applications," the disclosure of which is hereby incorporated by reference in its entirety.

FIELD

The disclosed subject matter relates to data entry in video conferencing and other systems that use remote controls and other non-keyboard-based user interface devices.

BACKGROUND

Video communication systems are used for facilitating interaction and collaboration. While computer-based systems (desktop videoconferencing) are gaining wide acceptance, so-called "room" systems are used as well. Room systems can be installed in traditional conference rooms, and feature one or more displays, a high-quality camera, often with pan-tilt-zoom (PTZ) capability, and a central operating unit. User interaction can be accomplished with a remote control unit. In early implementations, room systems were the typical solution for having a videoconference, using custom-made hardware that was included in the central operating unit. Today, users can connect to a conferencing session from a desktop or laptop computer, a tablet such as Apple's iPad, or a smartphone such as Apple's iPhone, since the functions of the central operating unit can today be performed using software that runs on the hardware systems.

One of the differences between the computer-based and tablet/smartphone-based solutions and the room-based system is that the latter typically is not equipped with a keyboard but a remote control. Contrary to other devices (e.g., a television), however, a videoconferencing unit may require significant user input in order to connect to a conference, or control an ongoing conference. Such remote controls typically feature a numeric keypad (0 through 9), navigation buttons (up-down, left-right), as well as a small number of special-purpose buttons. Entering textual data typically requires pressing each of the numeric keys several times, in order to reach the desired (alphabetic) character. This may be cumbersome, and has been an obstacle in making room systems easy to use.

This problem is not found exclusively in room-based videoconferencing systems, but can be present whenever alphabetic data entry is required through a numeric-only control device. One such example may be a set-top box, or a home media server device (e.g., Apple TV or Roku), among others.

There exists a need to simplify the process of entering textual data using a remote control.

SUMMARY

The disclosed subject matter provides techniques that can simplify the process of entering textual data using a remote control, and reduce the number of key clicks that a user must use in order to enter alphabetic characters, when using a control device that has only a numeric keypad.

Systems and methods for entering textual data using a remote control are disclosed herein. In one embodiment of the disclosed subject matter, multiple alphabetic characters are assigned to each of the numeric keys of the remote control, and are all displayed when the corresponding numeric key is pressed. The user can then select the desired alphanumeric character by using the navigation buttons of the remote control. In another embodiment select keys of the numeric keypad may be used as navigation buttons.

BRIEF DESCRIPTION OF THE DRAWINGS

FIGS. 2A-2L depict the association of alphanumeric characters to remote control numeric buttons together with associated exemplary display of these characters to facilitate selection, in accordance with an embodiment of the disclosed subject matter;

Throughout the figures, similar reference numerals and characters, unless otherwise stated, are used to denote like features, elements, components or portions of the illustrated embodiments. Moreover, while the disclosed subject matter will now be described in detail with reference to the figures, it is done so in connection with the illustrative embodiments.

DETAILED DESCRIPTION

Figure 1:
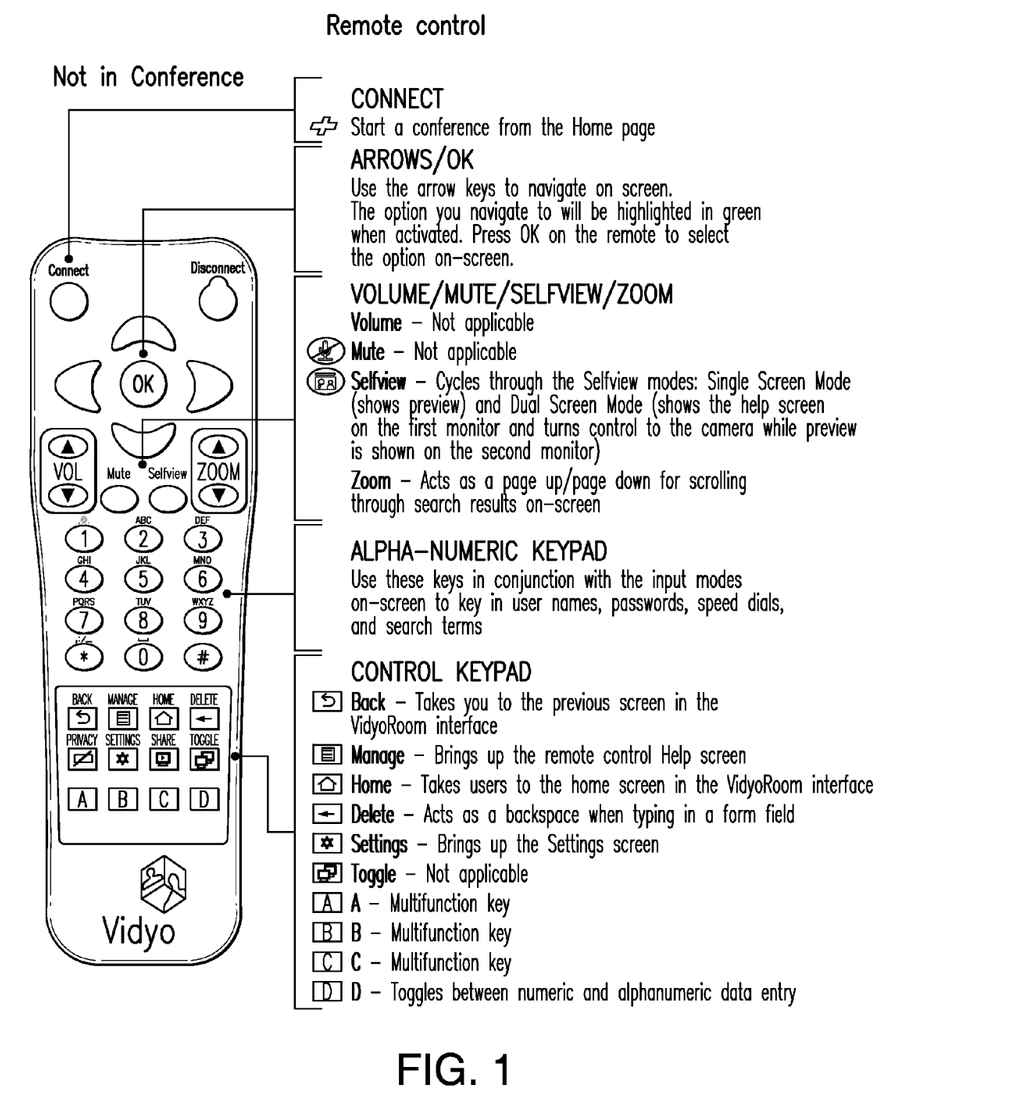
FIG. 1 depicts an exemplary remote control unit in accordance with an embodiment of the disclosed subject matter.

FIG. 1. depicts an exemplary remote control unit. The remote control can be similar to the one depicted at "http://www.vidyo.com/documents/support/v2.2/VidyoRoom_User's_Guide_2.2.pdf" and incorporated herein by reference in its entirety.

The remote can feature an alphanumeric keypad at its center, a set of directional, or navigation, buttons in the upper portion, including an 'OK' button ("Arrows/OK"), as well as a set of special-purpose and multi-function keys, including the 'A', 'B', 'C', and 'D' multifunction keys. The depicted remote control unit is designed to be used in videoconferencing systems, but remote controls in most applications use such alphanumeric keypads and navigation keypads. In some remote control units, the navigation keypad has a 'Select' button; in other remote control units, it may feature a single "rocker" button that can be pressed in four different directions as well as pressed in to perform the selection function.

The alphanumeric keypad typically features 12 buttons that cover the ten digital ('0' through '9') as well as the special symbols '*' and '#'. Each of these buttons "doubles" as a character entry button, by associating a number of alphanumeric buttons to it. For example, in the example remote control of FIG. 1 the number '2' is also associated with the letters 'A', 'B', and 'C'. When a user is supposed to enter alphabetic characters, he or she can press the numeric key repeatedly in order to select one of the associated characters. This technique has been widely used in telephony, for allowing users to type text messages (SMS) to other users using phones that lack a full keyboard. The layout and character associations are today more or less standardized, allowing users to quickly type messages. The process however may be cumbersome as it requires multiple presses of each of the keys to find the desired character. Also, if a mistake is made, the user has to cycle through all the characters to re-select the desired one. Using the remote control unit of FIG. 1 as an example, a user would have to press the key '2' four times to find the letter 'C': one to select '2', a second to switch to the letter 'A', and two more to go through 'B' and 'C'. To enter the desired character the user has to either continue by pressing another button, in which case the currently selected character is entered as the desired choice, or wait for a pre-determined time for the selection process to be completed. For example, when the same letter appears in succession (e.g., two 't's in a row) the user has to first select the first 't' (by pressing the number '8' twice), then wait for the timeout, and then enter the second 't' (by again pressing the number '8' twice).

Figure 2A:
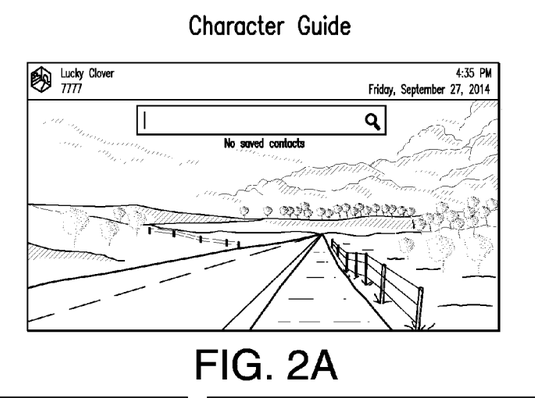

We now describe an improved system and method for entering alphanumeric data using a remote control device with reference to FIGS. 2A-2L. FIG. 2A depicts a window of an application that requires textual input. In this particular example, the field is supposed to be the contact to be called in a videoconferencing system, but the system and method can be applied on any application where remote control units are used for textual data entry.

Figure 2B:
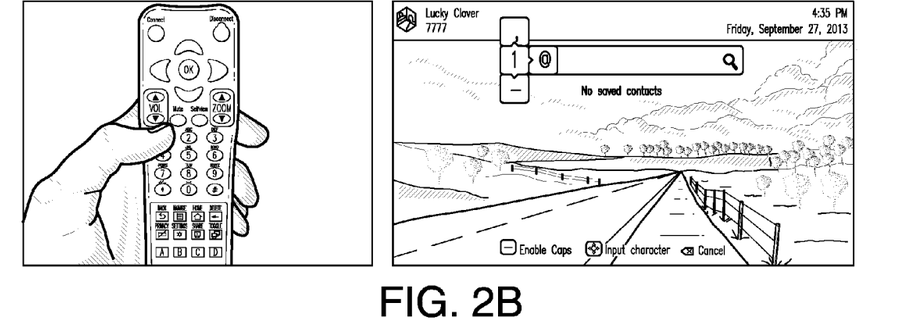
Figure 2C:
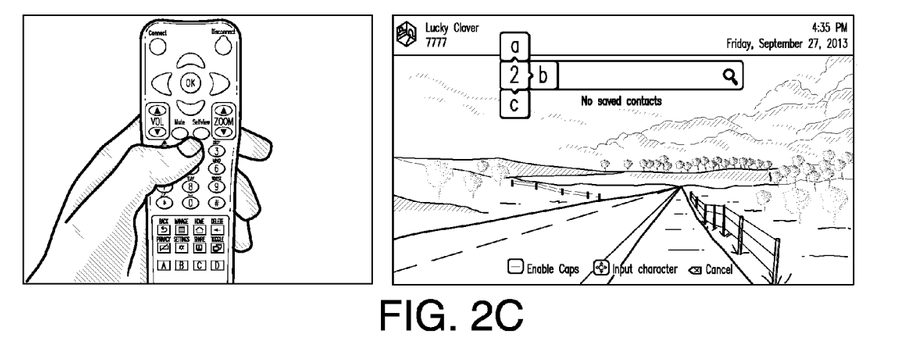
Figure 2D:
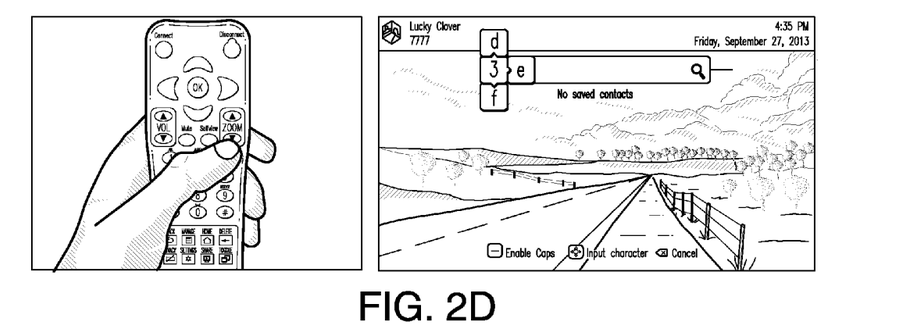
Figure 2E:
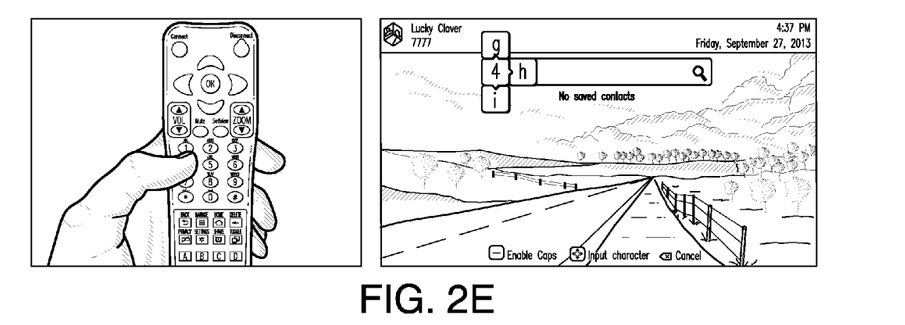
Figure 2F:
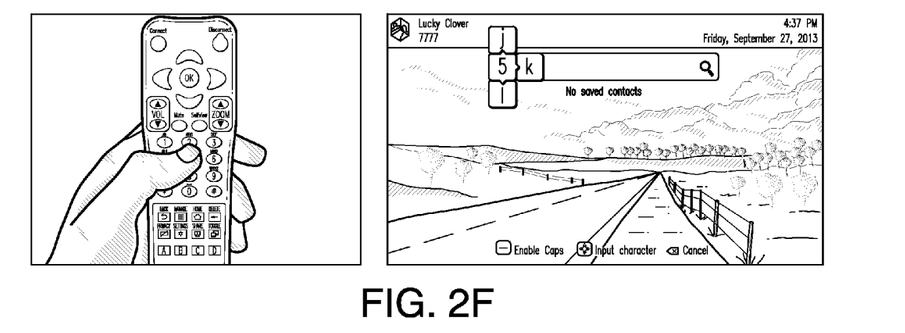
Figure 2G:
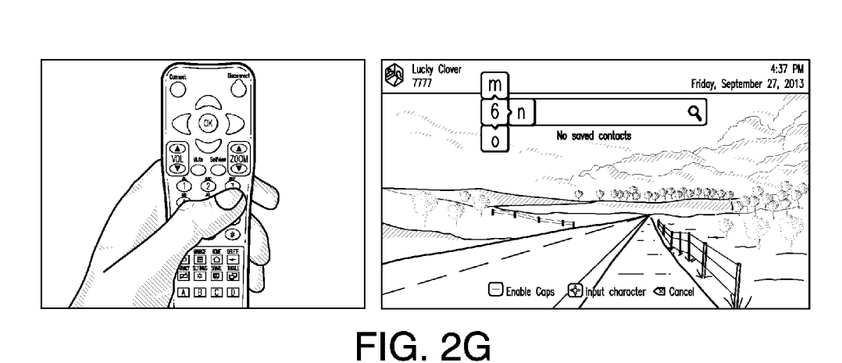
Figure 2H:
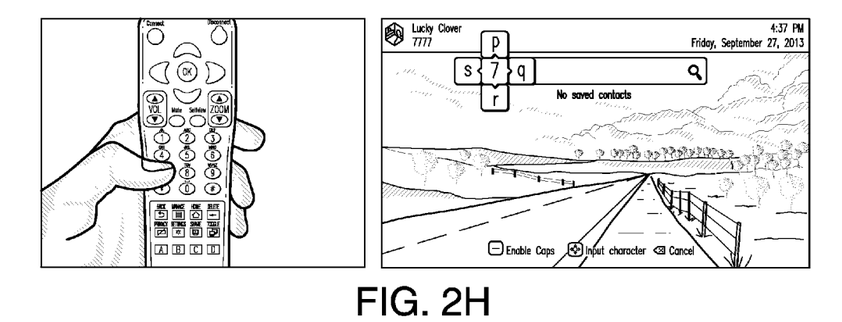
Figure 2I:
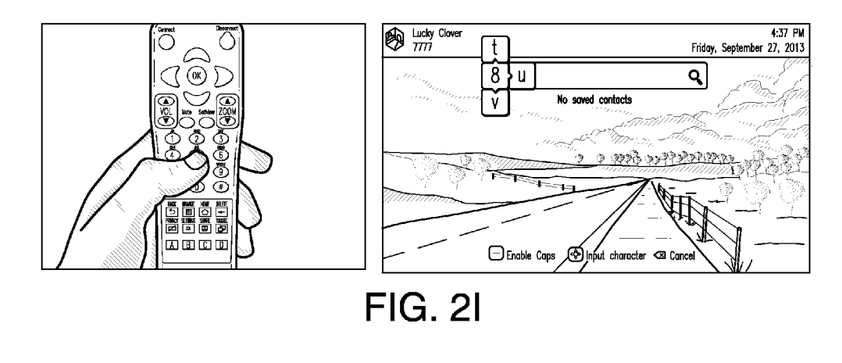
Figure 2J:
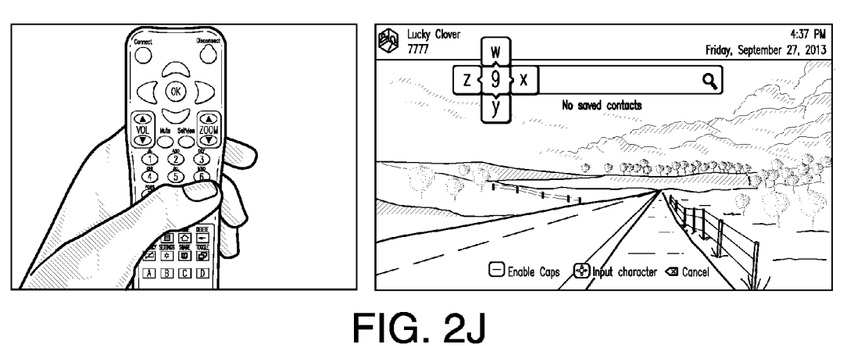
Figure 2K:
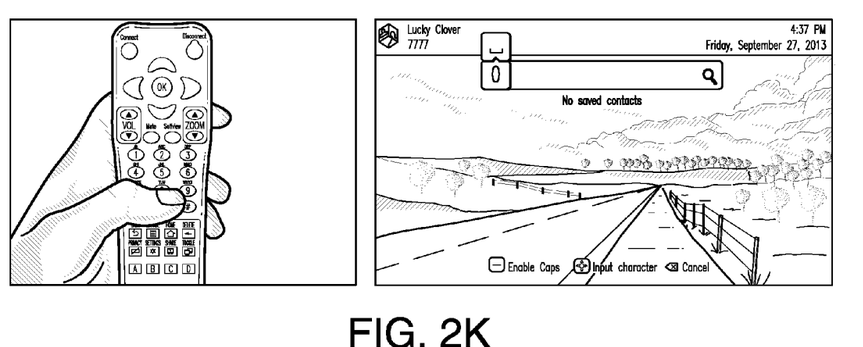

The system operates such that, when a numeric keypad key is pressed on the remote control unit, the display-13 under the commands of a user interface processor—depicts the associated alphanumeric characters on the display, at the then-current position of the cursor. FIG. 2B depicts the associated characters that are displayed when key '1' is pressed. The associated characters ',', '@', and '-' are displayed surrounding the letter '1' in a cross-like configuration. Similarly, FIGS. 2C-2L depict the same for all other numeric keypad keys. In some instances, such as the number '7' (FIG. 2H), five choices are shown in a cross (or four-leaf clover) configuration, where the number '7' is at the center and the four associated alphabetic characters ('p', 'q', 'r', and 's') are shown surrounding '7'.

The display of the associated character on the screen, as shown in FIGS. 2A-2L, allows a user to easily see the associated alphanumeric characters that correspond to a particular key. The positioning, however, of the displayed characters, in a cross configuration, allows now the use of the navigation keypad to select one of the associated keys.

The process can work as follows. The user first pressed one of the keys of the numeric keypad. The system then displays on the screen the associated alphanumeric characters, e.g., as in FIG. 2H where '7' is assumed to be first. The user then uses the navigation buttons to move up, down, left, or right, to select one of the surrounding alphabetic characters, and then pressed the 'OK' (or 'Select', or equivalent) button to make a particular choice. If the digit '7' is desired then the user may just enter the 'OK' button directly without moving with the navigational buttons. The user then proceeds to make selections alternating between the numeric keypad and the navigational keypad, where the latter is used to select one of the multiple choices that are assigned to each key of the numeric keypad. The positioning of the displayed choices is such that there is a direct association with the four spatial directions (up, down, left, right). The fact that at most four choices (plus the numeric digit) are assigned to each of the numeric keypad keys ensures that a user can select a character with at most two key presses per character.

Figure 3A:
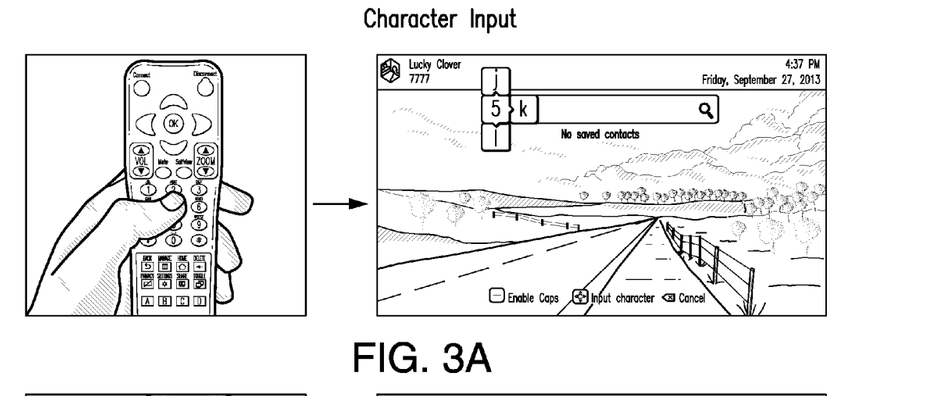
FIGS. 3A-3C depict the process of capitalization and viewing of additional characters as well as use of the corresponding directional key to input the desired character, in accordance with an embodiment of the disclosed subject matter.
Figure 3B:
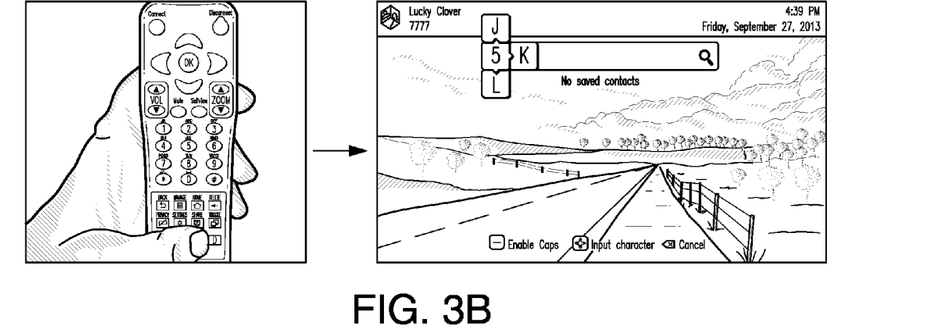
Figure 3C:
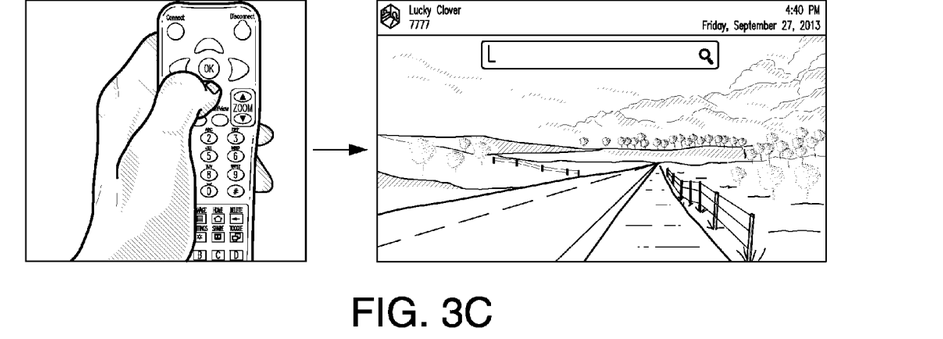

FIGS. 3A-3C depict an example of the process of entering data. In FIG. 3A the user starts by pressing the '5' key. The system displays the associated letters ('j', 'k', and 'l', as well as the number '5') on the screen. In this example, the user then presses one of the multifunction keys, in this instance 'C', to switch to capital letters. This is shown in FIG. 3B. Notice that to the right of FIG. 3C the letters are now in capitals: 'J', 'K', and 'L'. The user then presses the 'Down' key in the navigation keypad so that the letter 'L' is selected. This is shown in FIG. 3C. Notice that when the 'Down' key is selected, the letter 'L' alone appears on the display as the selected letter.

When numeric-only input is required, the user can simply keep typing on the numeric keypad. Since the default selection each time the alphanumeric "clover" is shown on the screen is the number, the user can keep typing without using the navigation keypad.

Figure 4A:
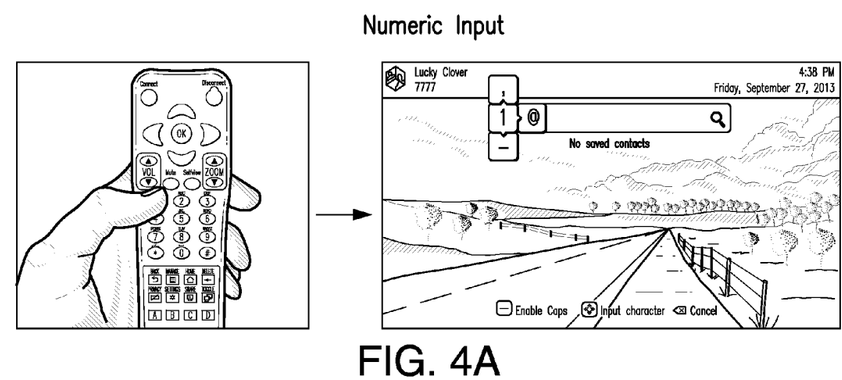
FIGS. 4A-4D demonstrate how the user can enter numbers in accordance with an embodiment of the disclosed subject matter.
Figure 4B:
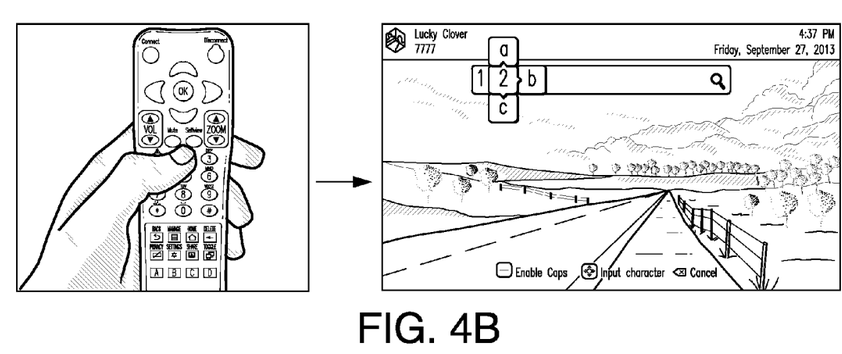
Figure 4C:
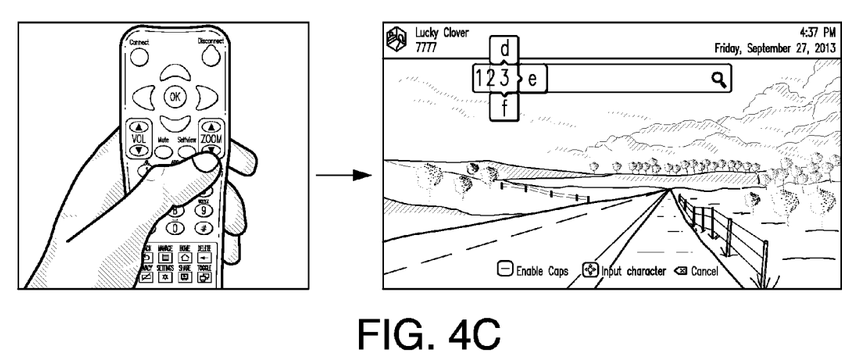
Figure 4D:
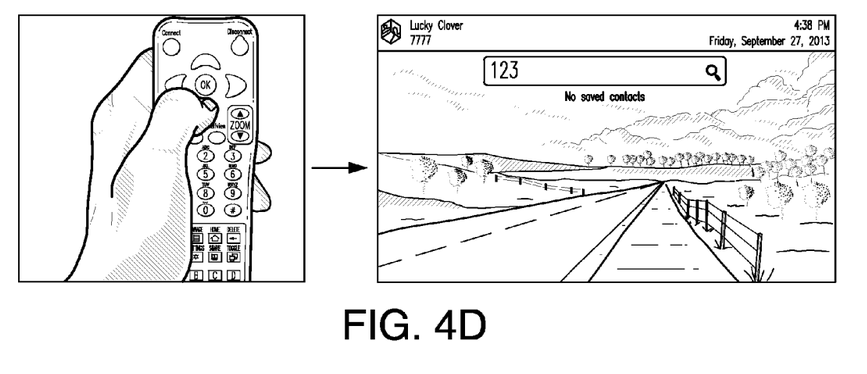

FIGS. 4A-4D depict an example where the user enters the number "123". In FIG. 4A the user first presses the number '1' on the numeric keypad. The system displays the characters ',', '@', and '-', together with the number '1' at the center of the "clover". The user then pressed the number '2' on the numeric keypad, as shown in FIG. 4B. This accepts the number '1' previously shown and displays a new "clover," now showing the number '2' and its associated alphabetic characters 'a', 'b', and 'c'. The user then proceeds to press the number '3' on the numeric keypad, as shown in FIG. 4C. This accepts the number '2' previously shown and displays a new "clover," now showing the number '3' and its associated alphabetic characters 'd', 'e', and 'f'. Since the number is complete, the user presses the 'OK' button in the navigational keypad to terminate the data entry process. This is shown in FIG. 4D.

In cases where there is no navigational keypad, the same numeric keypad can be used in its place. In such an embodiment, the numeric keypad will alternatively be in numeric and navigational mode. In the numeric mode, the keypad operates as a normal numeric keypad. In navigational mode, the keypad can be configured such that the number '2' corresponds to the 'Up' button, the number '8' to the 'Down' button, the number '4' to the 'Left' button, the number '6' to the 'Right' button, and finally the number '5' to the 'OK' or 'Select' button. The particular layout has the benefit that the physical layout of the buttons resembles the physical positioning of the corresponding buttons in a navigational keypad. Other assignments are also possible. For example the 'OK' or 'Select' button role could be played by one (or more than one) of the non-numeric keys, such as '#'. The system can switch the mode of the keypad depending on the current state of data entry, in an alternating mode of operation. After a numeric key is pressed, the system displays the data entry choices and switches to navigation mode until the 'OK' or 'Select' button is pressed.

In some embodiments of the disclosed subject matter, the display of the additional characters may follow a more complicated spatial positioning pattern. While the cross configuration may be suitable for choosing among up to 5 characters, a 3×3 matrix may be used for selecting among 9. The same navigation process can be used in this instance as well. Additional navigation buttons moving in diagonal directions may further reduce the number of clicks that a user needs to make to perform data entry. Other configurations including diamond-shaped patterns, and other spatial configuration can be used. In displays equipped with 3D capability, it is also possible to position the choices in three dimensions. A suitable set of navigation buttons to move in the Z direction may be used here as well.

The methods for fast keyboard entry using a remote control in video conferencing and other applications described above can be implemented as computer software using computer-readable instructions and physically stored in computer-readable medium. The computer software can be encoded using any suitable computer languages. The software instructions can be executed on various types of computers. For example, FIG. 5 illustrates an exemplary computer system 500 suitable for implementing exemplary embodiments of the disclosed subject matter.

Figure 5:
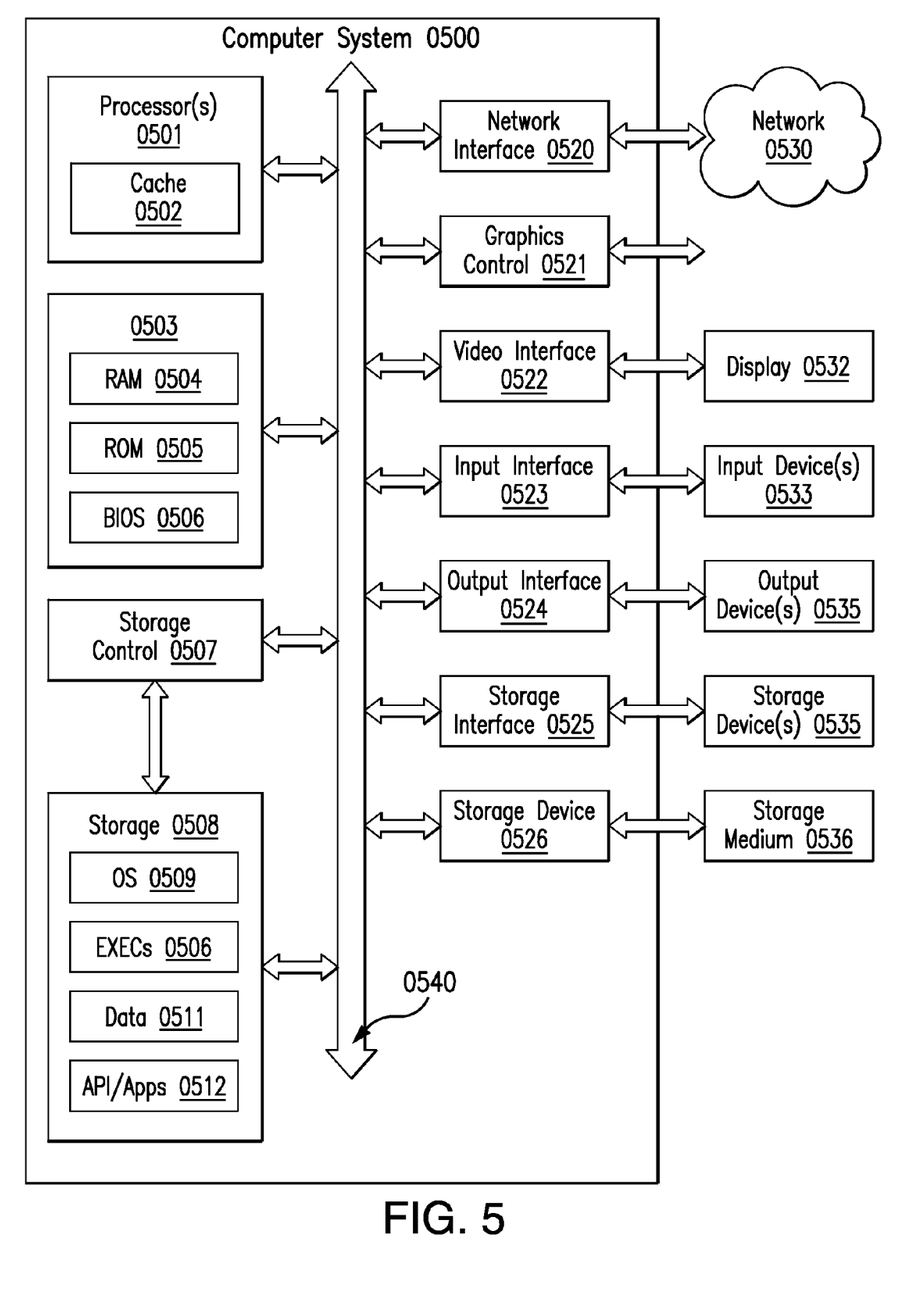
FIG. 5 depicts an exemplary computer system for implementing one or more embodiments of the disclosed subject matter.

By way of example, the components shown in FIG. 5 for computer system 500 are exemplary in nature and are not intended to suggest any limitation as to the scope of use or functionality of the computer software implementing embodiments of the disclosed subject matter. The configuration of components should not be interpreted as having any dependency or requirement relating to any one or combination of components illustrated in the exemplary embodiment of a computer system. Computer system 500 can have many physical forms including an integrated circuit, a printed circuit board, a small handheld device (such as a mobile telephone or PDA), a personal computer or a super computer.

Computer system 500 can include a display 532, one or more input devices 533 (e.g., keypad, keyboard, mouse, stylus, etc.), one or more output devices 534 (e.g., speaker), one or more storage devices 535, and various types of storage media 536.

The system bus 540 can link a wide variety of subsystems. As understood by those skilled in the art, a "bus" can refer to a plurality of digital signal lines serving a common function. The system bus 540 can be any of several types of bus structures including a memory bus, a peripheral bus, and a local bus using any of a variety of bus architectures. By way of example and not limitation, such architectures can include the Industry Standard Architecture (ISA) bus, Enhanced ISA (EISA) bus, the Micro Channel Architecture (MCA) bus, the Video Electronics Standards Association local (VLB) bus, the Peripheral Component Interconnect (PCI) bus, the PCI-Express bus (PCI-X), and the Accelerated Graphics Port (AGP) bus.

Processor(s) 501 (also referred to as central processing units, or CPUs) optionally can contain a cache memory unit 502 for temporary local storage of instructions, data, or computer addresses. Processor(s) 501 can be coupled to storage devices including memory 503. Memory 503 can include random access memory (RAM) 504 and read-only memory (ROM) 505. As is well known in the art, ROM 505 can act to transfer data and instructions uni-directionally to the processor(s) 501, and RAM 504 can be used to transfer data and instructions in a bi-directional manner. Both of these types of memories can include any suitable of the computer-readable media described below.

A fixed storage 508 also can be coupled bi-directionally to the processor(s) 501, optionally via a storage control unit 507. It can provide additional data storage capacity and can also include any of the computer-readable media described below. Storage 508 can be used to store operating system 509, EXECs 510, application programs 512, data 511 and the like and can be a secondary storage medium (such as a hard disk) that is slower than primary storage. It should be appreciated that the information retained within storage 508, can, in appropriate cases, be incorporated in standard fashion as virtual memory in memory 503.

Processor(s) 501 also can be coupled to a variety of interfaces such as graphics control 521, video interface 522, input interface 523, output interface 524, storage interface 525, and these interfaces in turn can be coupled to the appropriate devices. In general, an input/output device can be any of: video displays, track balls, mice, keyboards, microphones, touch-sensitive displays, transducer card readers, magnetic or paper tape readers, tablets, styluses, voice or handwriting recognizers, biometrics readers, or other computers. Processor(s) 501 can be coupled to another computer or telecommunications network 530 using network interface 520. With such a network interface 520, it can be contemplated that the CPU 501 might receive information from the network 530, or might output information to the network in the course of performing the above-described method. Furthermore, method embodiments of the disclosed subject matter can execute solely upon CPU 501 or can execute over a network 530 such as the Internet in conjunction with a remote CPU 501 that shares a portion of the processing.

According to various embodiments, when in a network environment, i.e., when computer system 500 is connected to network 530, computer system 500 can communicate with other devices that are also connected to network 530. Communications can be sent to and from computer system 500 via network interface 520. For example, incoming communications, such as a request or a response from another device, in the form of one or more packets, can be received from network 530 at network interface 520 and stored in selected sections in memory 503 for processing. Outgoing communications, such as a request or a response to another device, again in the form of one or more packets, can also be stored in selected sections in memory 503 and sent out to network 530 at network interface 520. Processor(s) 501 can access these communication packets stored in memory 503 for processing.

In addition, embodiments of the present disclosure further can relate to computer storage products with a computer-readable medium that can have computer code thereon for performing various computer-implemented operations. The media and computer code can be those specially designed and constructed for the purposes of the present disclosure, or they can be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter. Those skilled in the art should also understand that term "computer readable media" as used in connection with the disclosed subject matter does not encompass transmission media, carrier waves, or other transitory signals.

As an example and not by way of limitation, the computer system having architecture 500 can provide functionality as a result of processor(s) 501 executing software embodied in one or more tangible, computer-readable media, such as memory 503. The software implementing various embodiments of the present disclosure can be stored in memory 503 and executed by processor(s) 501. A computer-readable medium can include one or more memory devices, according to particular needs. Memory 503 can read the software from one or more other computer-readable media, such as mass storage device(s) 535 or from one or more other sources via communication interface. The software can cause processor(s) 501 to execute particular processes or particular parts of particular processes described herein, including defining data structures stored in memory 503 and modifying such data structures according to the processes defined by the software. In addition or as an alternative, the computer system can provide functionality as a result of logic hardwired or otherwise embodied in a circuit, which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The disclosed subject matter encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A system for performing data entry by a user, comprising:
    a user interface device including a plurality of data entry buttons, a plurality of navigation buttons, and an enter button;
    a user interface processor coupled to the user interface device; and
    a display coupled to the user interface processor, wherein the user interface processor is configured to repeatedly:
        (1) show on a cursor position on the display a plurality of character data choices in a layout corresponding to the user interface device, including a central character data choice, in response to the user pressing one or more of the plurality of data entry buttons; and
        either (2a) display first character data from the plurality of character data choices in the layout, in response to the user pressing one or more of the plurality of navigation buttons, and move to a following cursor position,
        or (2b) display the central character data choice, in response to the user pressing one or more of the plurality of data entry buttons, and move to the following cursor position; and
        (3) enter selected character data in response to the user pressing the entry button.

2. The system of claim 1 where the layout is a cross pattern depicting up to four additional data choices.

3. The system of claim 1 where the plurality of data buttons are configured to perform the function of the plurality of navigation buttons and of the entry button, in an alternating mode of operation.

4. A method comprising:
    (1) with a user interface processor, showing on a cursor position on a display a plurality of character data choices in a layout corresponding to a user interface device, including a central character data choice, in response to a user pressing one or more of a plurality of data buttons; and
    either (2a) displaying first character data from the plurality of character data choices in the layout in response to the user pressing one or more of a plurality of navigation buttons and moving to a following cursor position;
    or (2b) displaying the central character data choice, in response to the user pressing one or more of the plurality of data entry buttons and moving to the following cursor position; and
    (3) entering selected character data in response to the user pressing an entry button.

5. The method of claim 4 where the layout is a cross pattern depicting up to four additional data choices.

6. The method of claim 4 where the plurality of data buttons are configured to perform the function of the plurality of navigation buttons and of the entry button, in an alternating mode of operation.

7. A non-transitory computer readable medium comprising a set of executable instructions to direct a processor to perform the method recited in claim 4.

8. A non-transitory computer readable medium comprising a set of executable instructions to direct a processor to perform the method recited in claim 5.

9. A non-transitory computer readable medium comprising a set of executable instructions to direct a processor to perform the method recited in claim 6.

* * * * *